(12) United States Patent
Cutsforth

(10) Patent No.: US 8,714,860 B2
(45) Date of Patent: May 6, 2014

(54) MOUNTING FIXTURE INCLUDING AN ARTICULATION JOINT

(75) Inventor: Robert S. Cutsforth, Bellingham, WA (US)

(73) Assignee: Cutsforth, Inc., Cohasset, MN (US)

( * ) Notice: Subject to any disclaimer, the term of this patent is extended or adjusted under 35 U.S.C. 154(b) by 189 days.

(21) Appl. No.: 13/204,176

(22) Filed: Aug. 5, 2011

(65) Prior Publication Data
US 2013/0034380 A1   Feb. 7, 2013

(51) Int. Cl.
  *F16C 11/00*    (2006.01)
(52) U.S. Cl.
  USPC .............................. 403/101; 403/91; 403/156
(58) Field of Classification Search
  USPC ........... 403/64, 72, 73, 84, 91, 101, 145, 147, 403/148, 150, 154, 156, 161, 162, 205, 292, 403/295, 297, 119
  See application file for complete search history.

(56) References Cited

U.S. PATENT DOCUMENTS

| 451,300 | A | * | 4/1891 | Drew | 285/47 |
|---|---|---|---|---|---|
| 1,232,473 | A | * | 7/1917 | Andersen | 403/73 |
| 2,555,226 | A | * | 5/1951 | Draughn | 403/73 |
| 3,213,273 | A | * | 10/1965 | Zagel | 403/161 |
| 4,008,910 | A | * | 2/1977 | Roche | 285/153.1 |
| 4,548,446 | A | * | 10/1985 | Warshawsky | 403/97 |
| 4,717,180 | A | * | 1/1988 | Roman | 285/148.19 |
| 4,912,349 | A | * | 3/1990 | Chang | 403/91 |
| 5,083,882 | A | * | 1/1992 | Liu | 403/297 |
| 5,143,468 | A | | 9/1992 | Pausch | |
| 5,219,449 | A | | 6/1993 | Hoshino | |
| 2004/0202506 | A1 | | 10/2004 | Lazic | |

FOREIGN PATENT DOCUMENTS

| EP | 0 399 371 A1 | * | 11/1990 | ............. F16B 12/40 |
|---|---|---|---|---|
| GB | 2404712 A | | 2/2005 | |

OTHER PUBLICATIONS

McMaster-Carr Online Product Catalog, "Positioning Arms for Monitors & Equipment", Aug. 4, 2011, 4 pages.
McMaster-Carr Online Product Catalog, "Rail & Frame Fittings", Aug. 4, 2011, 6 pages.

* cited by examiner

*Primary Examiner* — Michael P Ferguson
(74) *Attorney, Agent, or Firm* — Seager, Tufte & Wickhem, LLC

(57) ABSTRACT

A mounting fixture for positioning a workpiece in a desired relationship with an apparatus including an articulation joint for coupling first and second tubular members in a desired angular relationship. The articulation joint includes a first end portion clamped to an interior surface of the first tubular member and a second end portion clamped to an interior surface of the second tubular member. First and second clamping members of the articulation joint are clamped together to prevent pivotable movement between a first articulation member and a second articulation member of the articulation joint.

8 Claims, 9 Drawing Sheets

MOUNTING FIXTURE INCLUDING AN ARTICULATION JOINT

TECHNICAL FIELD

The disclosure is directed to a mounting fixture for positioning a workpiece in a desired relationship with an apparatus. More particularly, the disclosure is directed to a mounting fixture including joints for coupling to tubular members, including an articulation joint for coupling between tubular members.

BACKGROUND

In some situations, it may be desirable to position a workpiece in a desired relationship with an apparatus. However, difficulties associated with manufacturing, configuring, assembling and positioning a mounting fixture for the workpiece may preclude properly positioning the workpiece. Accordingly, there is a need to provide a mounting fixture which may be customizable for any application in which it is desirable to position a workpiece in a fixed position relative to an apparatus to achieve the positioning desired.

SUMMARY

The disclosure is directed to several alternative designs, materials and methods of manufacturing mounting fixture structures and assemblies, and uses thereof.

Accordingly, one illustrative embodiment is a mounting fixture including a first tubular member, a second tubular member, and an articulation joint coupled between the first tubular member and the second tubular member to position the longitudinal axis of the first tubular member at a desired angle relative to the longitudinal axis of the second tubular member. The articulation joint has a maximum outer diameter less than or equal to the outer diameter of the first tubular member and less than or equal to the outer diameter of the second tubular member. The outer diameter of the first tubular member may be constant along an entire length of the first tubular member from a first end to a second end of the first tubular member and/or the outer diameter of the second tubular member may be constant along an entire length of the second tubular member from a first end to a second end of the second tubular member.

Another illustrative embodiment is a mounting fixture including a first tubular member, a second tubular member, and an articulation joint coupled between the first tubular member and the second tubular member to position the longitudinal axis of the first tubular member at a desired angle relative to the longitudinal axis of the second tubular member. The articulation joint includes a first articulation member pivotably coupled to a second articulation member at a pivot point. A first end portion of the articulation joint is configured to exert a radially outward clamping force against an inner surface of the first tubular member, and a second end portion of the articulation joint is configured to exert a radially outward clamping force against an inner surface of the second tubular member. The articulation joint is configured to exert an inward clamping force against the first articulation member and the second articulation member to clamp the first articulation member from pivotable movement relative to the second articulation member.

Another illustrative embodiment is a mounting fixture including a first tubular member, a second tubular member, and an articulation joint coupled between the first tubular member and the second tubular member to position the central longitudinal axis of the first tubular member at a desired angle relative to the central longitudinal axis of the second tubular member. The articulation joint includes a first articulation member including a first head and a first post, a second articulation member including a second head and a second post, a first clamping member including a first head portion and a first post portion, and a second clamping member including a second head portion and a second post portion. The first post and the first post portion are configured to extend into the first tubular member, and the second post and the second post portion are configured to extend into the second tubular member. The first post of the first articulation member and the first post portion of the first clamping member are configured to cooperatively exert a radially outward force on an interior surface of the first tubular member, and the second post of the second articulation member and the second post portion of the second clamping member are configured to cooperatively exert a radially outward force on an interior surface of the second tubular member. The first head portion of the first clamping member and the second head portion of the second clamping member are configured to cooperatively exert a compressive force against the first head of the first articulation member and the second head of the second articulation member to clamp the first articulation member from pivotable movement relative to the second articulation member.

Another illustrative embodiment is an articulation joint for coupling first and second tubular members in a desired angular relationship. The articulation joint includes a first articulation member including a first head and a first cylindrical post configured to extend into a tubular member, a second articulation member including a second head and a second cylindrical post configured to extend into a tubular member, a first clamping member including a first head portion and a first post portion, and a second clamping member including a second head portion and a second post portion. The first cylindrical post includes a channel extending into the first cylindrical post from a peripheral surface of the first cylindrical post, and the second cylindrical post includes a channel extending into the second cylindrical post from a peripheral surface of the second cylindrical post. The first head of the first articulation member includes a bearing surface and the second head of the second articulation member includes a bearing surface juxtaposed with the bearing surface of the first head of the first articulation member. The first post portion of the first clamping member is positioned in the channel defined in the first cylindrical post and the second post portion of the second clamping member is positioned in the channel defined in the second cylindrical post. The first head portion of the first clamping member and the second head portion of the second clamping member are positioned to clamp the first head of the first articulation member and the second head of the second articulation member therebetween.

Yet another illustrative embodiment is a method of constructing a mounting fixture configured to position a workpiece in a desired relationship with an apparatus. The method includes providing an articulation joint including a first articulation member pivotably coupled to a second articulation member. A first end portion of the articulation joint is clamped to a first end of a first tubular member having a longitudinal axis using a first threaded stud without clamping to an exterior surface of the first tubular member. A second end portion of the articulation joint is clamped to a second end of a second tubular member having a longitudinal axis using a second threaded stud without clamping to an exterior surface of the second tubular member. The first articulation member is clamped to the second articulation member using a third threaded stud while positioning the longitudinal axis of the first tubular member at a desired angle to the longitudinal axis of the second tubular member to prevent further movement between the first tubular member and the second tubular member. In some instances, the first articulation member may be welded to the second articulation member while the first articulation member is clamped to the second articulation member with the third threaded stud, the first tubular member may be welded to the first end portion of the articulation joint while the first end portion is clamped to the first tubular member with the first threaded stud, and/or the second tubular member may be welded to the second end portion of the articulation joint while the second end portion is clamped to the second tubular member with the second threaded stud.

The above summary of some example embodiments is not intended to describe each disclosed embodiment or every implementation of the aspects of the disclosure.

BRIEF DESCRIPTION OF THE DRAWINGS

The aspects of the disclosure may be more completely understood in consideration of the following detailed description of various embodiments in connection with the accompanying drawings, in which.

Figure 1:
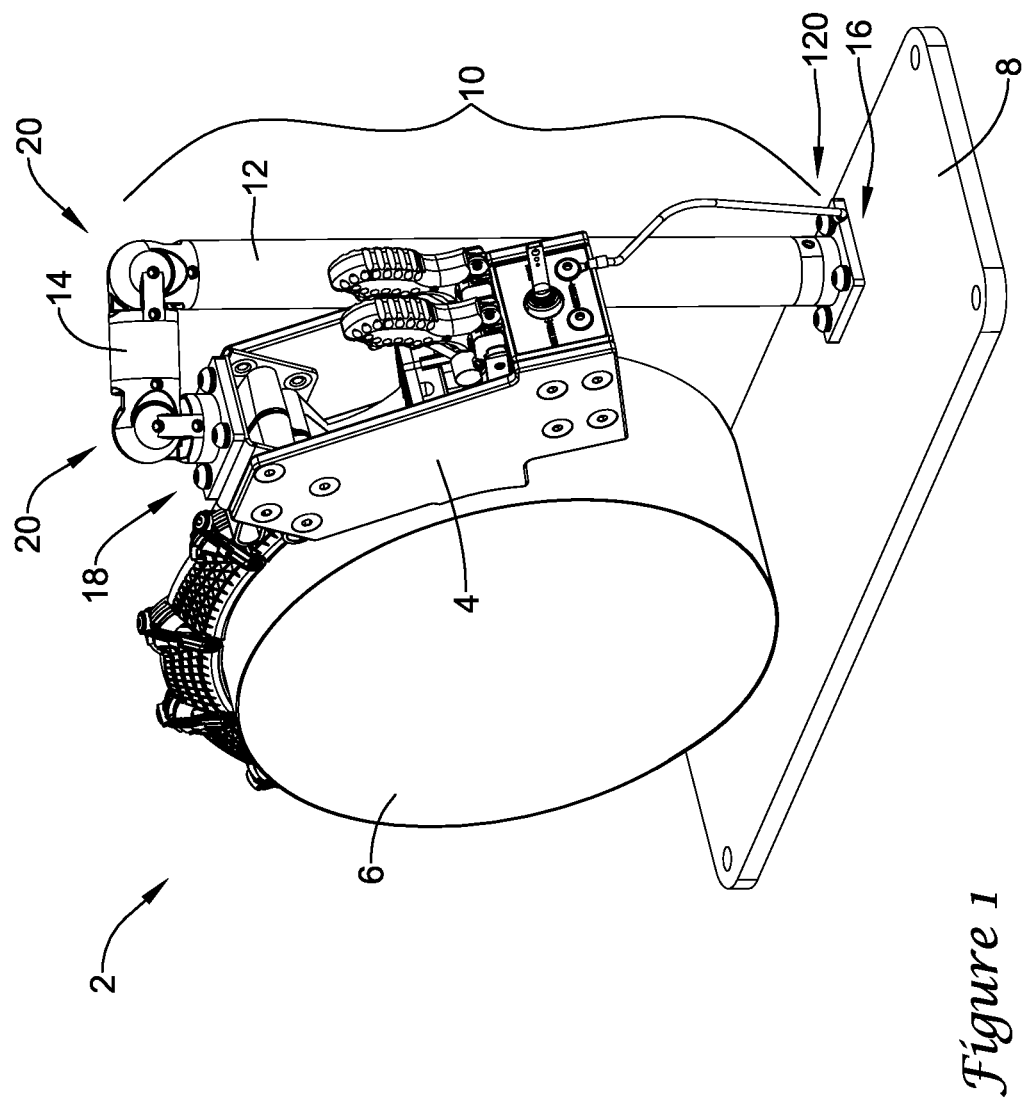
FIG. 1 is a perspective view of an exemplary system using a mounting fixture to position a workpiece in a desired relationship with an apparatus.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

FIG. 1 illustrates a system 2 including a mounting fixture 10 for positioning a workpiece 4 in a desired relationship with an apparatus 6. Accordingly, the mounting fixture 10 may be configured to fixedly secure the workpiece 4 in a desired position relative to the apparatus 6. In FIG. 1, the mounting fixture 10 is illustrated as fixedly positioning a shaft grounding assembly in a desired position relative to a rotating shaft of an electrical machine. Such a system 2 is further described in and relates to the subject matter contained in the U.S. patent application entitled SHAFT GROUNDING GUIDE filed on Aug. 5, 2011 by inventor Robert S. Cutsforth and having Ser. No. 13/204,134, which is expressly incorporated herein by reference in its entirety. However, it is understood that the mounting fixture 10 may be used for positioning any workpiece in a desired fixed relationship with an apparatus, such as in an industrial, commercial, governmental, recreational or residential environment. The mounting fixture 10 may include a first end 18 to which a workpiece 4 may be secured to. The mounting fixture 10 may also include a second end 20 which may be securely mounted to a stationary structure, such as base 8, which in some instances, may be a floor, wall, ceiling, plate, beam, post, scaffold, or other structure having sufficient rigidity to support the mounting fixture 10 and the workpiece 4 attached thereto.

The mounting fixture 10 may include one or more, or a plurality of tubular members interconnected into a desired orientation to position the workpiece 4 in a desired relationship with the apparatus 6. The mounting fixture 10 may also include one or more, or a plurality of joints coupled between tubular members of the mounting fixture 10. For example, the mounting fixture 10 may include one or more, or a plurality of articulation joints 20, configured to orient tubular members, such as first and second tubular members 12, 14 in a desired angular orientation. Additionally or alternatively, the mounting fixture 10 may include one or more, or a plurality of in-line joints 120, configured to couple tubular members in a desired axial orientation.

Figure 2:
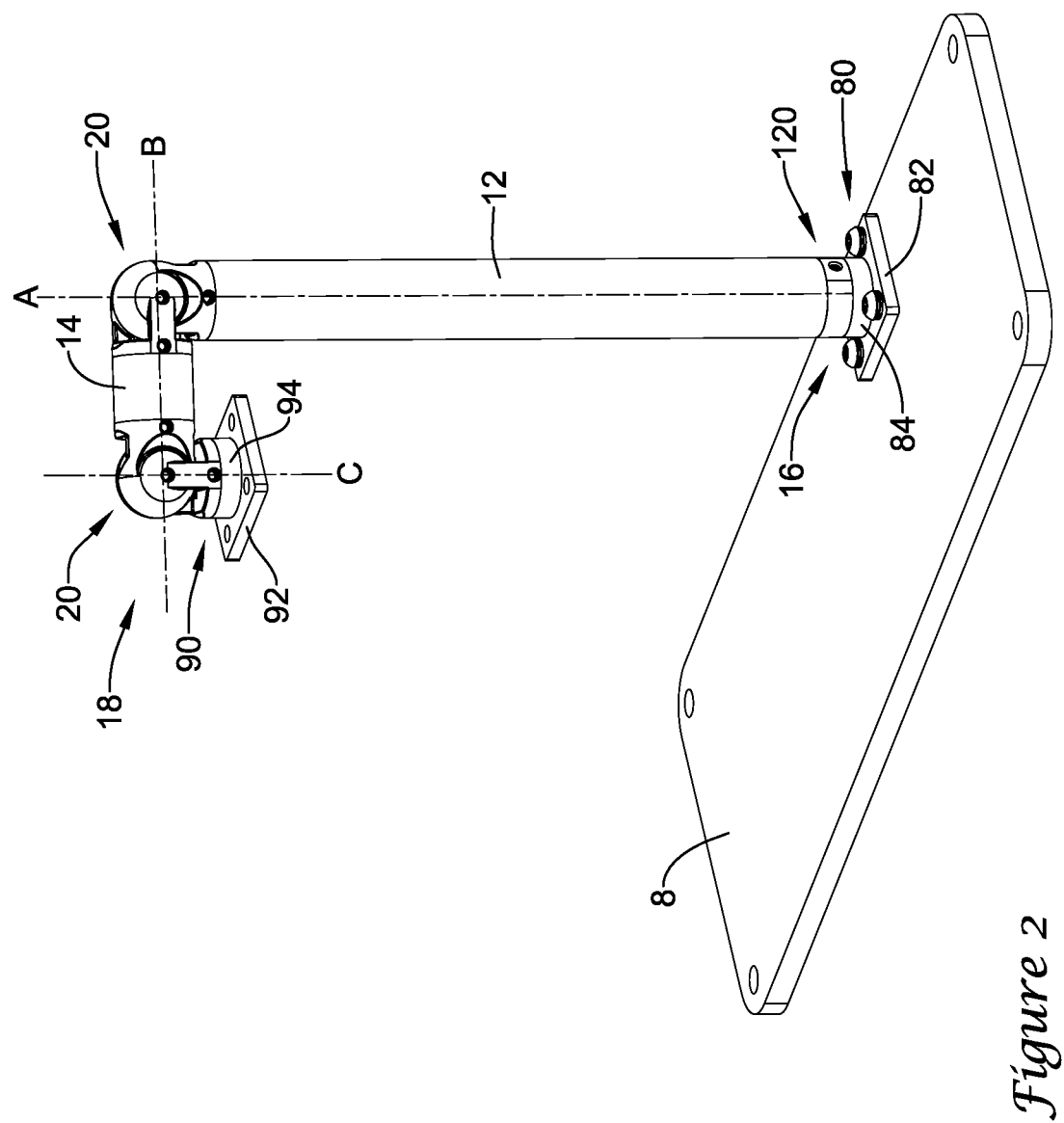
FIG. 2 is a perspective view of an exemplary mounting fixture.
Figure 3:
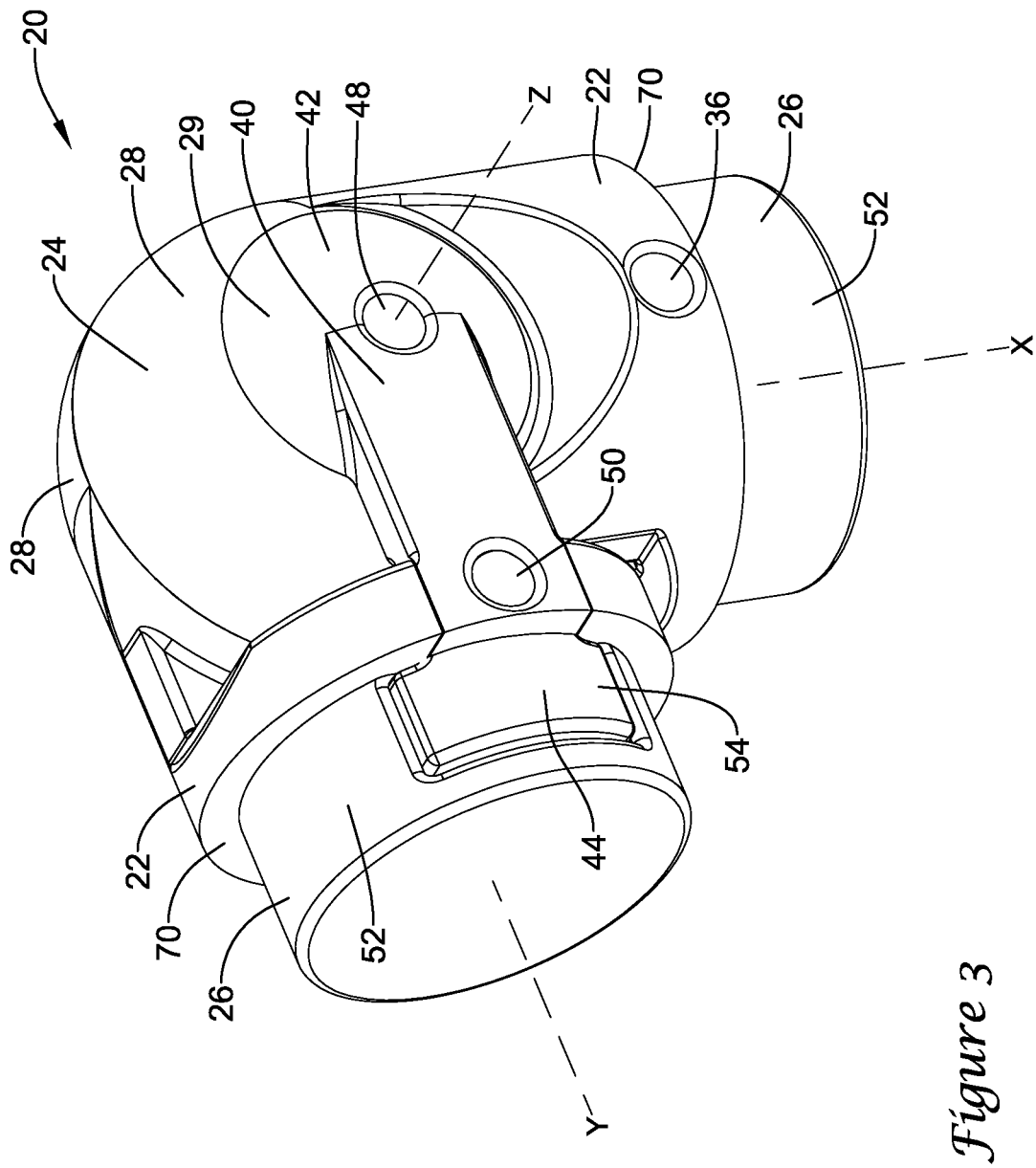
FIG. 3 is a perspective view of an exemplary articulation joint for a mounting fixture.

Turning to FIG. 2, some possible components of the mounting fixture 10 are further illustrated. The mounting fixture 10 may include a base mount 80 for mounting the first end 16 of the mounting fixture 10 to the base 8. For instance, the base mount 80 may include a mount plate 82 to be secured to the base 8 and a tubular extension 84 extending from the mount plate 82. In some instances, the mount plate 82 may include a plurality of mounting holes 86 (shown in FIG. 8) for receiving bolts, screws or other fasteners therethrough for fixedly mounting (e.g., bolting) the mount plate 82 to the base 8. In other instances, the mount plate 82 may be welded to the base 8, or otherwise secured to the base 8.

The mounting fixture 10 may also include a workpiece mount 90 for mounting the workpiece 4 to the second end 18 of the mounting fixture 10. For instance, the workpiece mount 90 may include a mount plate 92 to be secured to the workpiece 4 and a tubular extension 94 extending from the mount plate 94. In some instances, the mount plate 92 may include a plurality of mounting holes for receiving bolts, screws or other fasteners therethrough for fixedly mounting (e.g., bolting) the workpiece 4 to the mount plate 92. In other instances, the workpiece 4 may be welded to the mount plate 92, or otherwise secured to the mount plate 92. In still other embodiments, the workpiece 4 may include a tubular extension similar to the tubular extension 94, without the mount plate 92.

The tubular extensions 84, 94 may be sized to receive end portions (e.g., posts) of an articulation joint 20 and/or an in-line joint 120 therein in order to couple a joint 20, 120 to the base mount 80 and/or workpiece mount 90, as will be further described herein.

The mounting fixture 10 may also include one or more tubular members positioned in a desired arrangement, length, and/or orientation to position the workpiece 4 in a desired proximity to the apparatus 6. For example, the mounting fixture 10 may include a first tubular member 12 having a central longitudinal axis A extending between an in-line joint 120 and a first articulation joint 20, and a second tubular member 14 having a central longitudinal axis B extending between the first articulation joint 20 and a second articulation joint 20. The in-line joint 120 may be positioned between and couple the first tubular member 12 to the tubular extension 84 of the base mount 80, and the second articulation joint 20 may be positioned between and couple the second tubular member 14 to the tubular extension 94 of the workpiece mount 90. Accordingly, the tubular extension 84 of the base mount 80 may have a central longitudinal axis A coaxial with the first tubular member 12. Furthermore, the tubular extension 94 of the workpiece mount 90 may have a central longitudinal axis C. The first articulation joint 20 may allow the angle between the longitudinal axes A and B to be varied, while the second articulation joint 20 may allow the angle between the longitudinal axes B and C to be varied. Furthermore, the articulation joints 20 and/or the in-line joint 120 may permit the mounting fixture 10, or portions thereof, to be pivoted about the longitudinal axis A, the longitudinal axis B and/or the longitudinal axis C to position the workpiece 4 at a desired location.

In some instances each of the tubular members may have a constant outer diameter along an entire length of the tubular member from a first end to a second end of the tubular member. Accordingly, in some instances the articulation joint 20 may have a maximum outer diameter less than or equal to the outer diameter of the first tubular member 12 and less than or equal to the outer diameter of the second tubular member 14.

The articulation joint 20, which is further illustrated in FIGS. 3-6, may include a first articulation member 22a and a second articulation member 22b configured to selectively pivot relative to the first articulation member 22a about pivot axis Z. Furthermore, the articulation joint 20 may include a first clamping member 40a and a second clamping member 40b configured to selectively pivot relative to the first clamping member 40a about pivot axis Z. The first clamping member 40a may be configured to mate with the first articulation member 22a and selectively pivot with the first articulation member 22a about pivot axis Z (relative to the second articulation member 22b and the second clamping member 40b), while the second clamping member 40b may be configured to mate with the second articulation member 22b and selectively pivot with the second articulation member 22b about pivot axis Z (relative to the first articulation member 22a and the first clamping member 40a).

The first articulation member 22a may be substantially similar to the second articulation member 22b, thus further discussion of an articulation member 22 may be applicable to either the first articulation member 22a and/or the second articulation member 22b. In other words, in some instances the first articulation member 22a may be shaped the same as the second articulation member 22b (i.e., the shape of the first articulation member 22a may be equivalent to the shape of the second articulation member 22b). Similarly, the first clamping member 40a may be substantially similar to the second clamping member 40b, thus further discussion of a clamping member 44 may be applicable to either the first clamping member 40a and/or the second clamping member 40b. In other words, in some instances the first clamping member 40a may be shaped the same as the second clamping member 40b (i.e., the shape of the first clamping member 40a may be equivalent to the shape of the second clamping member 40b). It is noted that in some embodiments, the first articulation member 22a may not be similar to the second articulation member 22b and/or the first clamping member 40a may not be similar to the second clamping member 40b, if desired.

The articulation member 22 may include a head 24 and a post 26 extending from the head 24. The post 26 may be a cylindrical post 26 sized and configured to be insertable into an interior of a tubular member and rotatable therein about the longitudinal axis of the tubular member. In other words, the post 26 may have a diameter slightly less than an inner diameter of a tubular member into which the post 26 is configured to be inserted into. When inserted into a tubular member, the cylindrical peripheral surface 52 of the post 26 may face the inner surface of the tubular member.

The head 24 of the articulation member 22 may include a bearing surface 34 configured to be juxtaposed with a bearing surface 34 of the other articulation member 22 of the articulation joint 20. In some instances the bearing surface 34 may be substantially smooth, while in other instances, the bearing surface 34 may include roughenings, serrations, splines, or other engagement features.

The head 24 may include a spherical outer surface 28 providing the head 24 with a substantially hemispherical shape. Thus, when the heads 24 of the articulation joint 20 are joined together, a substantially spherical head may be formed. In other instances, the head 24 may have an outer surface of a different shape and/or configuration.

The head 24 may also include a recess 38, such as a conical recess, extending into the head 24 from the spherical outer surface 28 on an opposing side of the head 24 from the bearing surface 34. The recess 38 may define a clamping surface 58, such as a conical surface. In other instances, the recess 38 may be spherically concave, or otherwise concave in nature. The recess 38 may be symmetrical about the pivot axis Z. The articulation members 22 may be configured such that the recesses 38 are positioned on opposing sides of the articulation members 22a, 22b when the bearing surface 34 of the first articulation member 22a is facing the bearing surface 34 of the second articulation member 22b. The head 24 may also include a through bore 30 extending through the head 24 from the recess 28 to the bearing surface 34 axially aligned with the pivot axis Z.

The clamping member 40 may include a head portion 42 configured to mate with the head 24 of the articulation member 22. For instance, the head portion 42 may have an extension 46, such as a conical extension, configured to extend into the recess 38 of the head 24. The extension 46 may be symmetrical about the pivot axis Z. The extension 46 may define a clamping surface 56, such as a conical surface, configured to press against the clamping surface 58 of the recess 38 when a clamping force is applied. In other instances, the extension 46 may be spherically convex, or otherwise convex in nature to mate with the recess 28 of the head 24. It is noted that in other embodiments, the head 24 may include an extension, such as a conical or spherically convex extension, configured to mate with a recess, such as a conical or spherically concave recess of the head portion 42 of the clamping member 40.

The head portion 42 of the clamping member 40 may also include a spherically convex surface 29 opposing the extension 46 which may have the same radius of curvature as the spherically convex surface 28 of the head 24 of the articulation member 22. Thus, when assembled together, the spherically convex surfaces 28 of the heads 24 of the first and second articulation members 22a, 22b and the spherically convex surfaces 29 of the head portions 42 of the first and second clamping members 40a, 40b may collectively define a substantially spherical component of the articulation joint 20.

The head portion 42 of the clamping member 40 may also include a threaded bore 48 extending into the extension 46 of the head portion 42. In some instances, the threaded bore 48 may be a through bore extending entirely through the head portion 42, whereas in other instances, the threaded bore 48 may be a blind bore. As will be discussed further herein, the threaded bore 48 of the head portion 42 of the first clamping member 40a may include threading opposite to the threading of the threaded bore 48 of the head portion 42 of the second clamping member 40b. In other words, the threaded bore 48 of the first clamping member 40a may have right-handed threads, while the threaded bore 48 of the second clamping member 40b may have left-handed threads, or vise versa. The threaded bore 48 may be axially aligned with the pivot axis Z of the articulation joint 20, and thus axially aligned with the through bores 30 extending through the heads 24 of the first and second articulation members 22a, 22b.

The clamping member 40 may also include a post portion 44 configured to mate with the post 26 of the articulation member 22. For example, the post portion 44 may be sized, shaped and configured to be slidably disposed in a channel 32 extending into the post 26 from the peripheral cylindrical surface 52 of the post 26. The post portion 44 may be configured to translate in the channel 32 in a direction generally parallel to the pivot axis Z. The post portion 44 may include an arcuate surface 54 configured to complement the peripheral surface 52 of the post 26. For example, the arcuate surface 54 of the post portion 44 may have a radius of curvature corresponding to the radius of curvature of the peripheral surface 52 of the post 26. Thus, the arcuate surface 54 of the post portion 44 and the peripheral surface 52 of the post 26 may collectively define a substantially continuous cylindrical surface configured to face an inner surface of a tubular member when inserted therein.

The clamping member 40 may also include a threaded bore 50 axially aligned with a threaded bore 36 extending into the articulation member 22. The threaded bore 50 may include threads having a first handedness, while the threaded bore 36 may include threads having a second handedness, opposite the threads of the threaded bore 50. For example, the threaded bore 50 may have right-handed threads while the threaded bore 36 may have left-handed threads, or the threaded bore 50 may have left-handed threads while the threaded bore 36 may have right-handed threads.

A threaded stud 60, or other threaded fastener, may be threadably engaged with the threaded bore 50 of the clamping member 40 and the threaded bore 36 of the articulation member 22. The threaded stud 60 may include a first threaded end portion 62 having right-handed threads threadably engaged to one of the articulation member 22 and the clamping member 40 and a second threaded end portion 64 having left-handed threads threadably engaged to the other of the articulation member 22 and the clamping member 40. For example, in embodiments in which the threaded bore 50 includes right-handed threads, the first threaded end portion 62 (having right-handed threads) of the threaded stud 60 may be threadably engaged in the threaded bore 50 while the second threaded end portion 64 (having left-handed threads) of the threaded stud 60 may be threadably engaged in the threaded bore 36 (having left-handed threads). In embodiments in which the threaded bore 50 includes left-handed threads, the second threaded end portion 64 (having left-handed threads) of the threaded stud 60 may be threadably engaged in the threaded bore 50 while the first threaded end portion 62 (having right-handed threads) of the threaded stud 60 may be threadably engaged in the threaded bore 36 (having right-handed threads).

Accordingly, the articulation joint 20 may include a first threaded stud 60 threadably engaged with the threaded bore 50 of the first clamping member 40a and the threaded bore 36 of the first articulation member 22a, and a second threaded stud 60 threadably engaged with the threaded bore 50 of the second clamping member 40b and the threaded bore 36 of the second articulation member 22b. The threaded studs 60 may include a driver engagement feature 68, such as a hex opening for receiving a hex wrench (e.g. an Allen wrench), or other configuration, at the first end and/or the second end of the threaded stud 60 to rotate the threaded stud 60.

The articulation joint 20 may also include a third threaded stud 60 extending through the through bores 30 of the first and second articulation members 22a, 22b and threadably engaged in the threaded bores 48 of the first and second clamping members 40a, 40b. For example, in embodiments in which the threaded bore 48 of the first clamping member 40a includes right-handed threads and the threaded bore 48 of the second clamping member 40b includes left-handed threads, the first threaded end portion 62 (having right-handed threads) of the threaded stud 60 may be threadably engaged in the threaded bore 48 of the first clamping member 40a while the second threaded end portion 64 (having left-handed threads) of the threaded stud 60 may be threadably engaged in the threaded bore 48 of the second clamping member 40b. In embodiments in which the threaded bore 48 of the first clamping member 40a includes left-handed threads and the threaded bore 48 of the second clamping member 40b includes right-handed threads, the second threaded end portion 64 (having left-handed threads) of the threaded stud 60 may be threadably engaged in the threaded bore 48 of the first clamping member 40a while the first threaded end portion 62 (having right-handed threads) of the threaded stud 60 may be threadably engaged in the threaded bore 48 of the second clamping member 40b.

Figure 4:
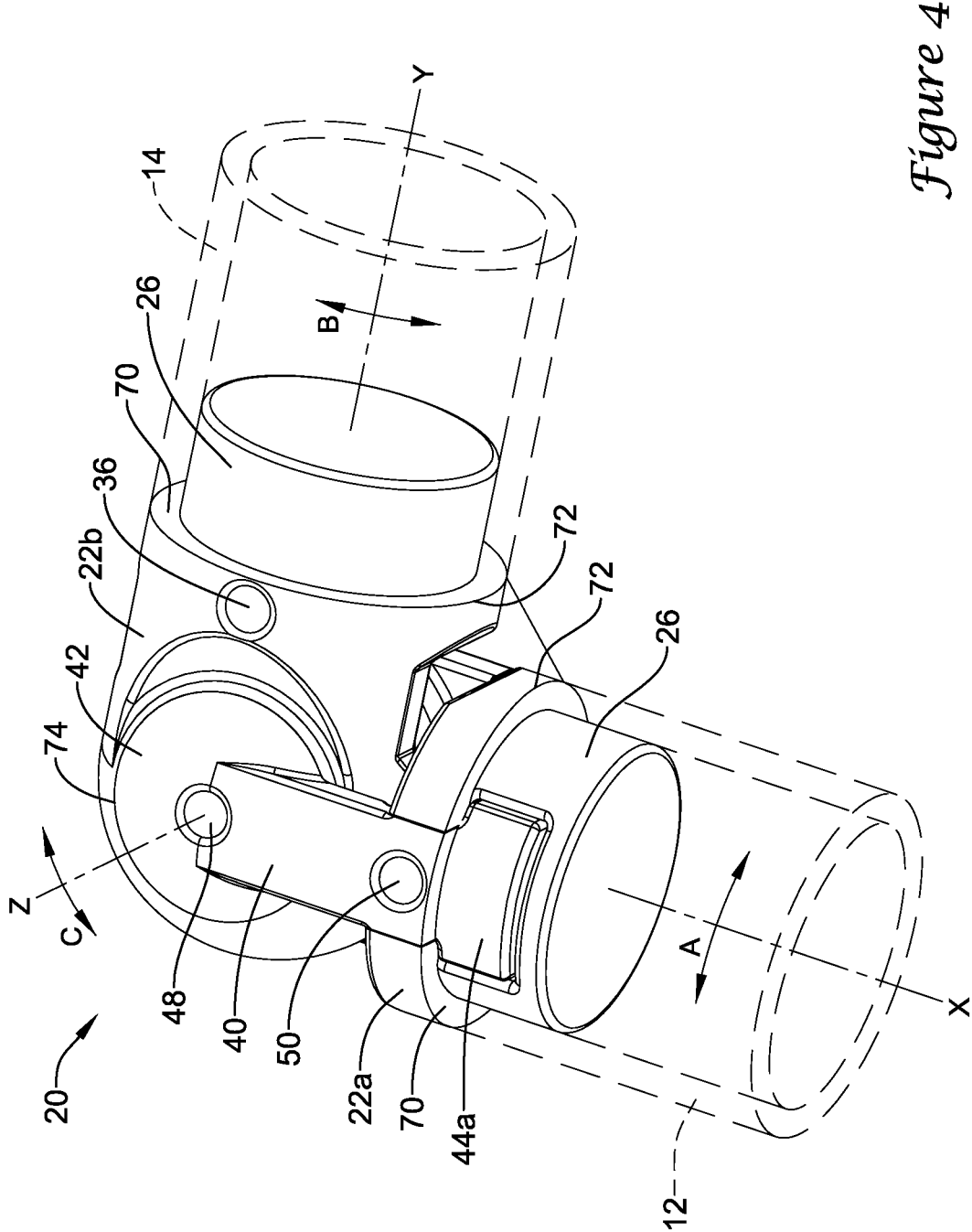
FIG. 4 is a perspective view of the articulation joint of FIG. 3 coupled between first and second tubular members.
Figure 5:
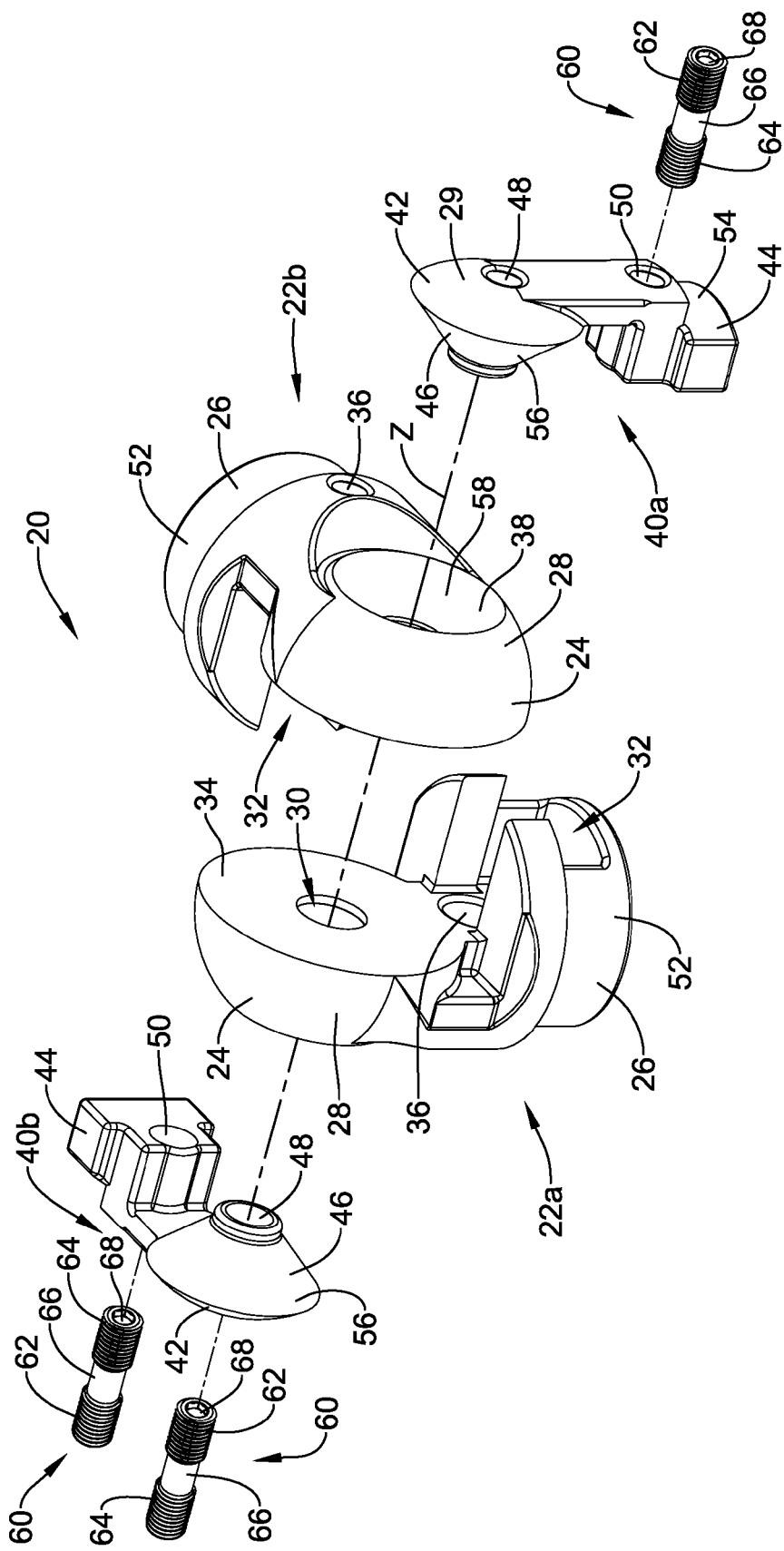
FIG. 5 is an exploded view of the articulation joint of FIG. 3.

As shown in FIG. 4, the first end portion of the articulation joint 20, including the post 26 of the first articulation member 22a and the post portion 44 of the first clamping member 40a, may be configured to be inserted into an end portion of a first tubular member 12, and the second end portion of the articulation joint 20, including the post 26 of the second articulation member 22b and the post portion 44 of the second clamping member 40b, may be configured to be inserted into an end portion of a second tubular member 14. In some instances, the first end portion of the articulation joint 20 may be inserted into the end portion of the first tubular member 12 via axial movement of the first end portion of the articulation joint 20 relative to the first tubular member 12 without rotation of the first end portion of the articulation joint 20 relative to the first tubular member 12. Likewise, the second end portion of the articulation joint 20 may be inserted into the end portion of the second tubular member 14 via axial movement of the second end portion of the articulation joint 20 relative to the second tubular member 14 without rotation of the second end portion of the articulation joint 20 relative to the second tubular member 14. The first end portion of the articulation joint 20 may include a rim 70 against which the end of the first tubular member 12 may abut, and the second end portion of the articulation joint 20 may include a rim 70 against which the end of the second tubular member 14 may abut. Prior to being clamped within the first tubular member 12, the first end portion of the articulation joint 20 may be free to axially translate (e.g., without rotation) and rotate within the first tubular member 12, and prior to being clamped within the second tubular member 14, the second end portion of the articulation joint 20 may be free to axially translate (e.g. without rotation) and rotate within the second tubular member 14.

When inserted into a tubular member, the post 26 may be coaxial with the central longitudinal axis of the tubular member. For example, as shown in FIG. 4, the post 26 of the first articulation member 22a may be coaxial with the central longitudinal axis X of the first tubular member 12, and the post 26 of the second articulation member 22b may be coaxial with the central longitudinal axis Y of the second tubular member 14. The articulation joint 20 may permit a range of adjustment for the mounting fixture 10. For example, the articulation joint 20 may be rotated relative to the first tubular member 12 about the longitudinal axis X as shown by arrow A to adjust the azimuthal angle of the pivot axis Z about the longitudinal axis X. Additionally, the articulation joint 20 may be rotated relative to the second tubular member 14 about the longitudinal axis Y as shown by arrow B to adjust the azimuthal angle of the pivot axis Z about the longitudinal axis Y. Furthermore, the angle between the longitudinal axis X, and thus the first tubular member 12, and the longitudinal axis Y, and thus the second tubular member 14 may be adjusted by pivoting the first articulation member 22a and clamping member 40a relative to the second articulation member 22b and clamping member 40b about the pivot axis Z as shown by arrow C. Thus, the articulation joint 20, coupled between the first tubular member 12 and the second tubular member 14, may position the longitudinal axis X of the first tubular member 12 at a desired angle relative to the longitudinal axis Y of the second tubular member 14. Accordingly, the articulation joint 20 may permit a wide range of adjustments to the mounting fixture 10 in order to adapt the mounting fixture 10 to any desired configuration for positioning the workpiece 4 in a desired position relative to the apparatus 6. Furthermore, the first tubular member 12 and/or the second tubular member 14 may be cut to any desired length to adapt the mounting fixture 10 to any desired arrangement.

Figure 6:
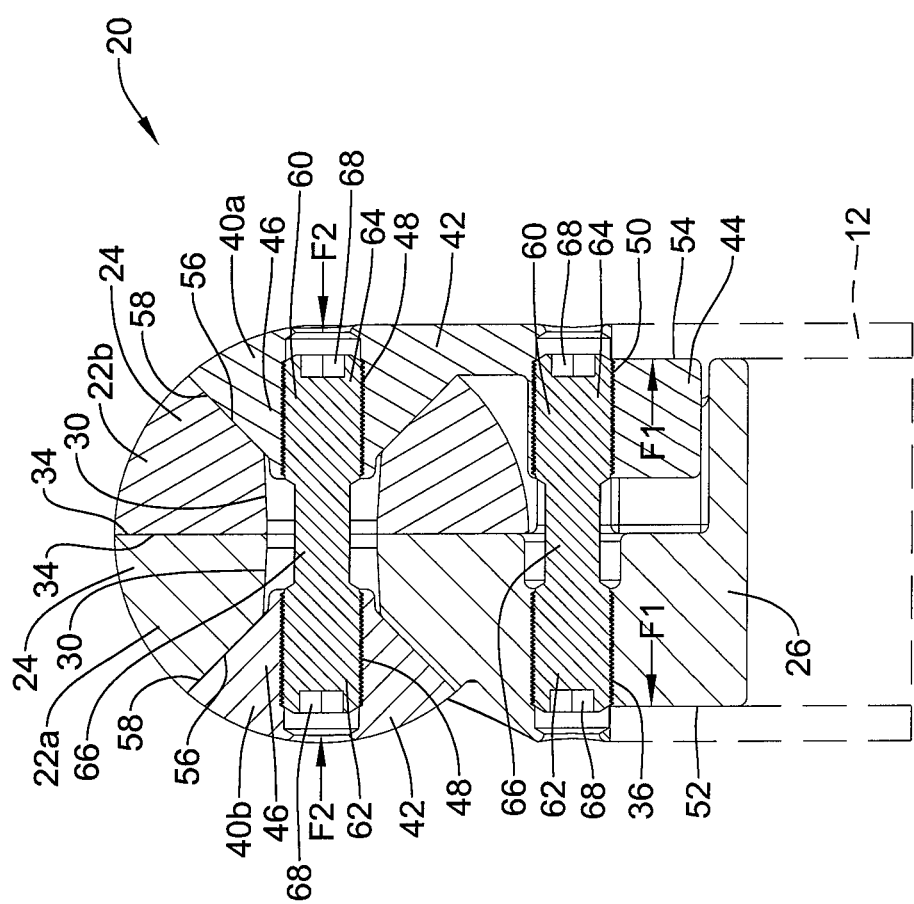
FIG. 6 is a cross-sectional view of the articulation joint of FIG. 3.

Once the desired orientation of the mounting fixture 10, or components thereof, has been obtained, the articulation joint 20 may be secured to the first and/or second tubular members 12, 14. For example, as shown in FIG. 6, the post 26 of the first articulation member 22a and the post portion 44 of the first clamping member 40a, inserted into the end region of the first tubular member 12, may be configured to cooperatively exert a radially outward force F1 on an interior surface of the first tubular member 12. For example, the threaded stud 60 may be rotated in a first direction (e.g., with a driver inserted into the driver engagement feature 68) to move the post portion 44 of the first clamping member 40a relative to the post 26 of the first articulation member 22a in the channel 32 to cooperatively exert a radially outward force on the interior surface of the first tubular member 12. Thus, the peripheral surface 52 of the post 26 and the arcuate surface 54 of the post portion 44 may bear against the interior surface of the first tubular member 12 to lock the articulation joint 20 from rotation relative to the first tubular member 12 about the longitudinal axis X. Accordingly, the first end portion of the articulation joint 20 may be clamped to the end of the first tubular member 12 without clamping to an exterior surface of the first tubular member 12. Furthermore, in some instances, the articulation joint 20 may be sized such that no portion of the articulation joint 20 has a diameter greater than the outer diameter of the first tubular member 12. In other words, in some instances, the articulation joint 20 may be sized such that the greatest diameter of the articulation joint 20 is less than or equal to the outer diameter of the first tubular member 12.

Similarly, the post 26 of the second articulation member 22b and the post portion 44 of the second clamping member 40b, inserted into the end region of the second tubular member 14, may be configured to cooperatively exert a radially outward force on an interior surface of the second tubular member 14. For example, the threaded stud 60 may be rotated in a first direction (e.g., with a driver inserted into the driver engagement feature 68) to move the post portion 44 of the second clamping member 40b relative to the post 26 of the second articulation member 22b in the channel 32 to cooperatively exert a radially outward force on the interior surface of the second tubular member 14. Thus, the peripheral surface 52 of the post 26 and the arcuate surface 54 of the post portion 44 may bear against the interior surface of the second tubular member 14 to lock the articulation joint 20 from rotation relative to the second tubular member 14 about the longitudinal axis Y. Accordingly, the second end portion of the articulation joint 20 may be clamped to the end of the second tubular member 14 without clamping to an exterior surface of the second tubular member 14. Furthermore, in some instances, the articulation joint 20 may be sized such that no portion of the articulation joint 20 has a diameter greater than the outer diameter of the second tubular member 14. In other words, in some instances, the articulation joint 20 may be sized such that the greatest diameter of the articulation joint 20 is less than or equal to the outer diameter of the second tubular member 14.

As can be evidenced from FIG. 6, due to the opposing threadedness of the threaded bores 36, 50 and the threaded end regions 62, 64 of the threaded stud 60, rotation of the threaded stud 60 in a first direction acts to force the post 26 and the post portion 44 apart, whereas rotation of the threaded stud 60 in a second, opposite direction acts to draw the post portion 44 toward the post 26.

Once the desired angular orientation between the first tubular member 12 and the second tubular member 14 has been obtained, the articulation joint 20 may be locked from further pivotable movement about the pivot axis Z. In some instances, the first clamping member 40a, the second clamping member 40b, the first articulation member 22a, and the second articulation member 22b may collectively interlock with each other at the pivot point of the articulation joint 20 to fix the first tubular member 12 at a desired angle relative to the second tubular member 14.

For example, the head portion 42 of the first clamping member 40a and the head portion 42 of the second clamping member 40b may be positioned on opposing sides of the heads 24 of the first and second articulation members 22a, 22b to clamp the head 24 of the first articulation member 22a and the head 24 of the second articulation member 22b therebetween. For example, the head portion 42 of the first clamping member 40a and the head portion 42 of the second clamping member 40b may be configured to cooperatively exert a compressive force F2 against the head 24 of the first articulation member 22a and the head 24 of the second articulation member 22b to clamp the first articulation member 22a from pivotable movement relative to the second articulation member 22b. For instance, the threaded stud 60 may be rotated in a first direction (e.g., with a driver inserted into the driver engagement feature 68) to move the head portion 42 of the first clamping member 40a toward the head portion 42 of the second clamping member 40b to clamp the heads 24 of the first and second articulation members 22a, 22b therebetween. Accordingly, the conical 56 of the conical extension 46 of the clamping member 40 may bear against the conical surface 58 of the conical recess 38 of the articulation member 22, which in turn presses the bearing surface 34 of the first articulation member 22a against the bearing surface 34 of the second articulation member 22b to lock the first and second articulation members 22a, 22b of the articulation joint 20 from pivotable rotation relative one another about the pivot axis Z.

As can be evidenced from FIG. 6, due to the opposing threadedness of the threaded bore 48 of the first clamping member 40a and the threaded bore 48 of the second clamping member 40b, and the threaded end regions 62, 64 of the threaded stud 60, rotation of the threaded stud 60 in a first direction acts to move or draw the head portions 42 of the clamping members 40 toward one another to clamp the heads 24 of the articulation members 22, whereas rotation of the threaded stud 60 in a second, opposite direction acts to move or draw the head portions 42 of the clamping members 40 away from one another to unclamp the heads 24 of the articulation members 22.

In some instances, the articulation joint 20 may be configured such that the driver engagement features 68 on either end of the threaded stud 60 may be accessible for engagement with a driver for rotation of the threaded stud 60, whereas in other instances, only one driver engagement feature 68 at one end of the threaded stud 60 may be accessible for engagement with a driver for rotation of the threaded stud 60. The threaded studs 60 may be configured to be fully positioned within the bores of the articulation joint 20 such that no portion of the threaded studs 60 extends beyond the outer surfaces of the other components of the articulation joint 20. In some instances, each of the three threaded studs 60 of the articulation joint 20 may be configured to be actuated (e.g., rotated) in a single rotational direction to generate the associated clamping forces.

Once the mounting fixture 10, or components thereof, has been locked into a desired configuration, in some instances the articulation joint 20 may be welded to prevent unintentional loosening of the articulation joint 20. In other words, in some instances, the threaded studs 60 may be used to provisionally or temporarily clamp the articulation joint 20 from pivotable movement and/or provisionally or temporarily clamp the articulation joint 20 to the first and second tubular members 12, 14 until the articulation members 22 are permanently secured from relative pivotable movement and/or the articulation joint 20 is permanently secured to the first and second tubular members 12, 14.

For example, as shown in FIG. 4, the first tubular member 12 may be welded to the first end portion of the articulation joint 20 around the interface 72 between the first tubular member 12 and the first articulation member 22a and the first clamping member 40a proximate the rim 70 while the first end portion of the articulation joint 20 is clamped to the first tubular member 12 with the threaded stud 60, thus forming a metallurgical bond between the first tubular member 12 and the first articulation member 22a and the first clamping member 40a at the interface 72. Likewise, the second tubular member 14 may be welded to the second end portion of the articulation joint 20 around the interface 72 between the second tubular member 14 and the second articulation member 22b and the second clamping member 40b proximate the rim 70 while the second end portion of the articulation joint 20 is clamped to the second tubular member 14 with the threaded stud 60, thus forming a metallurgical bond between the second tubular member 14 and the second articulation member 22b and the second clamping member 40b at the interface 72.

Similarly, the head portion 42 of the first clamping member 40a, which engages the head 24 of the second articulation member 22b, may be welded to the head 24 of the second articulation member 22b around the interface 74 between the head portion 42 and the head 24 while the first articulation member 22a is clamped to the second articulation member 22b with the threaded stud 60, thus forming a metallurgical bond between the head 24 of the second articulation member 22b and the head portion of the first clamping member 40a at the interface 74. Likewise, the head portion 42 of the second clamping member 40b, which engages the head 24 of the first articulation member 22a, may be welded to the head 24 of the first articulation member 22a around the interface 74 between the head portion 42 and the head 24 while the first articulation member 22a is clamped to the second articulation member 22b with the threaded stud 60, thus forming a metallurgical bond between the head 24 of the first articulation member 22a and the head portion of the second clamping member 40b at the interface 74.

Any desired welding technique may be used, and the tubular members, as well as the components of the articulation joint 20 may be formed of any desired metal material permitting welding, such as stainless steel, steel, aluminum, tungsten, titanium, or other metal materials. For example, in some instances, a tungsten inert gas (TIG) welding process may be used to weld the head portions 42 of the clamping members 40 to the respective heads 24 of the articulation members 22, and to weld the tubular members to the articulation joints 20. Other welding techniques for creating a metallurgical bond between the various components may be used, such as metal inert gas (MIG) welding or manual metal arc (MMA) welding, if desired.

Figure 7:
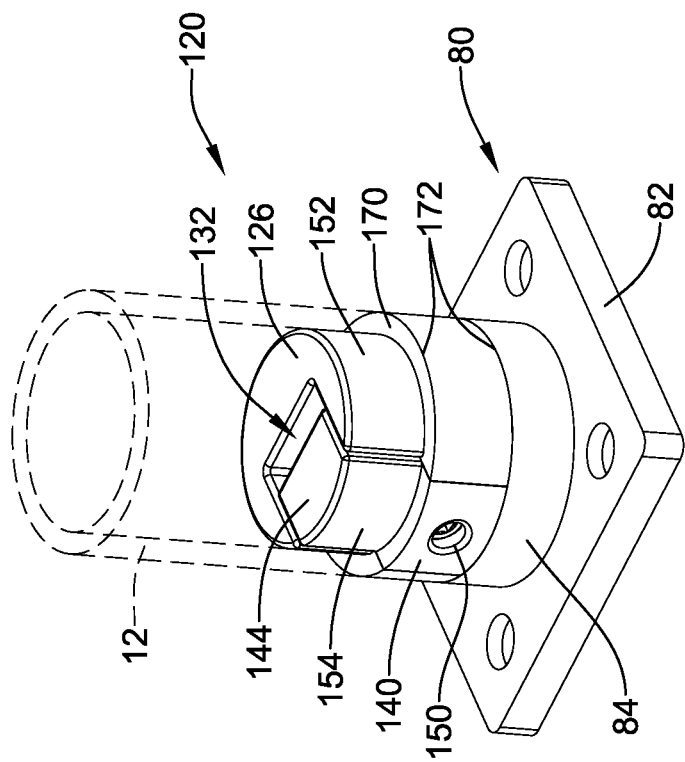
FIG. 7 is a perspective view of an exemplary in-line joint for a mounting fixture.

The mounting fixture 10 may also include one or more, or a plurality of in-line joints 120, one of which is illustrated in FIG. 7 to couple tubular members together in a coaxial relationship. For example, as shown in FIG. 7, the in-line joint 120 may be used to coaxially couple the tubular extension 84 extending from the mount plate 82 of the base mount 80 to the first tubular member 12.

Figure 8:
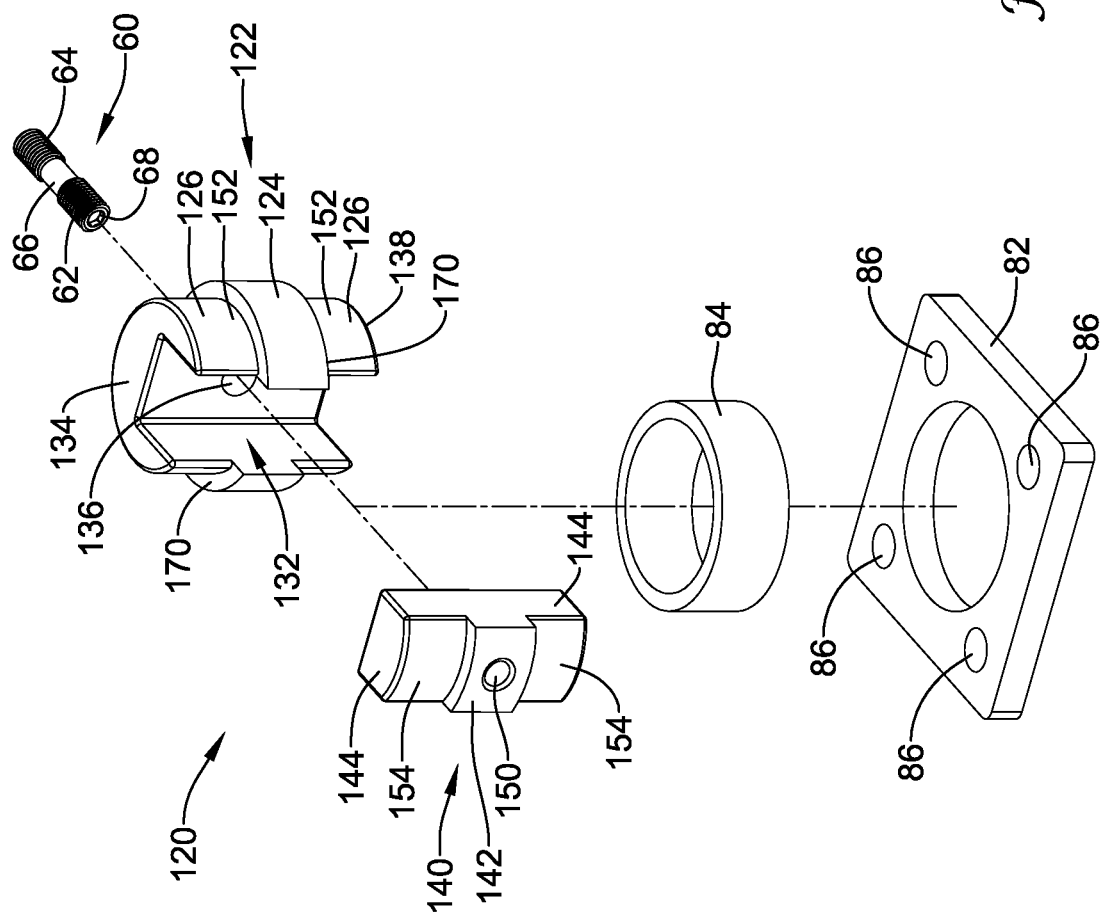
FIG. 8 is an exploded view of the in-line joint of FIG. 7.

As shown in FIG. 8, the in-line joint 120 may include a connector 122 and a clamping member 140 movable relative to the connector 122. The connector 122 may include a central portion 124, such as a central cylindrical portion, and first and second posts 126 extending from the central portion 124 in opposite directions. The clamping member 140 may include a central portion 142 and first and second post portions 144 extending from the central portion 142 in opposite directions. The connector 122 may include an elongate channel 132 extending from a first end 134 of the connector 122 to a second end 138 of the connector 122. The elongate channel 132 may open out to a peripheral side of the connector 122, permitting the clamping member 140 to be positioned in the channel 132.

When the clamping member 140 is positioned in the channel 132 of the connector 122, the first post portion 144 of the clamping member 140 may mate with or complement the first post 126 of the connector 122 proximate the first end 134, while the second post portion 144 of the clamping member 140 may mate with or complement the second post 126 of the connector 122 proximate the second end 138. For example, the posts 126 may include a cylindrical outer surface 152 having a radius of curvature and the post portions 144 may include an arcuate surface 154 having a radius of curvature substantially equal to the radius of curvature of the cylindrical outer surface 152, providing substantially continuous cylindrical surfaces around the in-line connector 120 at each of the first and second ends of the in-line connector 120.

Furthermore, the central portion 142 of the clamping member 140 may mate with or complement the central portion 124 of the connector 122, providing a cylindrical central portion of the in-line joint 120. In some instances the central portion 142 of the clamping member 140 may have an outer surface having a radius of curvature substantially equal to the radius of curvature of the outer surface of the central portion 124 of the connector 122, providing a substantially continuous cylindrical surface around a central portion of the in-line connector 120.

The central portion 142 of the clamping member 140 may also include a threaded bore 150 axially aligned with a threaded bore 136 extending into central portion 124 of the connector 122. The threaded bore 150 may include threads having a first handedness, while the threaded bore 136 may include threads having a second handedness, opposite the threads of the threaded bore 150. For example, the threaded bore 150 may have right-handed threads while the threaded bore 136 may have left-handed threads, or the threaded bore 150 may have left-handed threads while the threaded bore 136 may have right-handed threads.

A threaded stud 60, or other threaded fastener, may be threadably engaged with the threaded bore 150 of the clamping member 140 and the threaded bore 136 of the connector 122. The threaded stud 60 may include a first threaded end portion 62 having right-handed threads threadably engaged to one of the connector 122 and the clamping member 140 and a second threaded end portion 64 having left-handed threads threadably engaged to the other of the connector 122 and the clamping member 140. For example, in embodiments in which the threaded bore 150 includes right-handed threads, the first threaded end portion 62 (having right-handed threads) of the threaded stud 60 may be threadably engaged in the threaded bore 150 while the second threaded end portion 64 (having left-handed threads) of the threaded stud 60 may be threadably engaged in the threaded bore 136 (having left-handed threads). In embodiments in which the threaded bore 150 includes left-handed threads, the second threaded end portion 64 (having left-handed threads) of the threaded stud 60 may be threadably engaged in the threaded bore 150 while the first threaded end portion 62 (having right-handed threads) of the threaded stud 60 may be threadably engaged in the threaded bore 136 (having right-handed threads). The threaded stud 60 may include a driver engagement feature 68, such as a hex opening for receiving a hex wrench (e.g. an Allen wrench), or other configuration, at the first end and/or the second end of the threaded stud 60 to rotate the threaded stud 60.

In some instances, the in-line joint 120 may be configured such that the driver engagement features 68 on either end of the threaded stud 60 may be accessible for engagement with a driver for rotation of the threaded stud 60, whereas in other instances, only one driver engagement feature 68 at one end of the threaded stud 60 may be accessible for engagement with a driver for rotation of the threaded stud 60. The threaded stud 60 may be configured to be fully positioned within the bores of the in-line joint 120 such that no portion of the threaded studs 60 extends beyond the outer surfaces of the connector 122 and clamping member 140 of the in-line joint 120.

Figure 9:
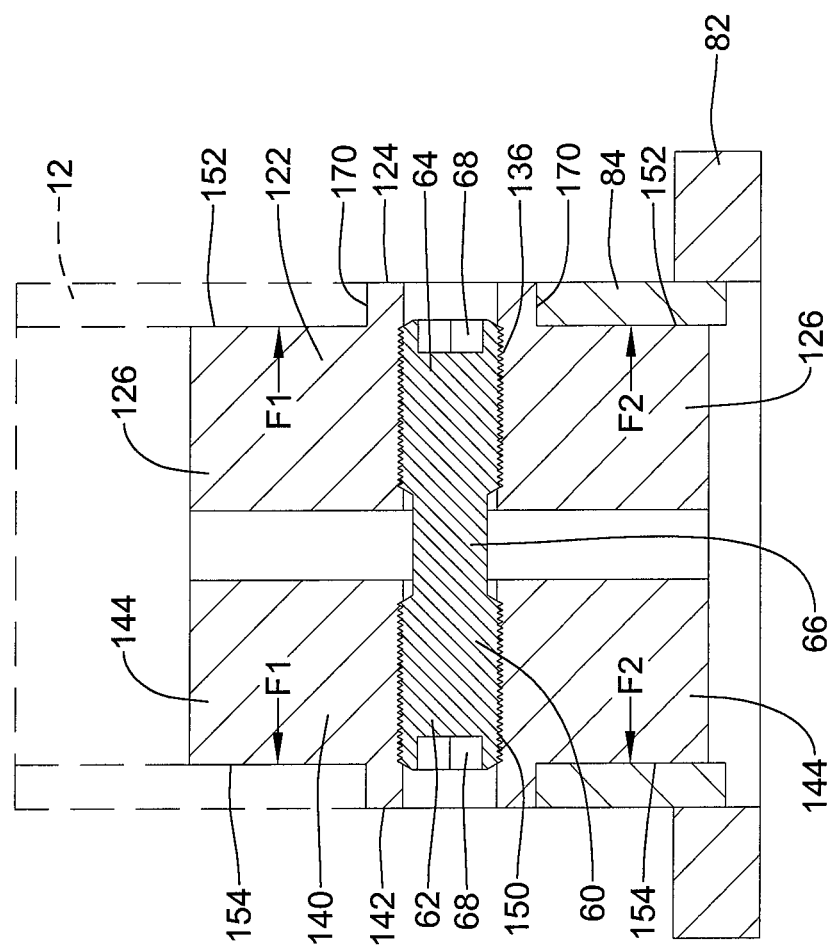
FIG. 9 is a cross-sectional view of the in-line joint of FIG. 7.

As shown in FIG. 9, the first end portion of the in-line joint 120, including a first post 126 of the connector 22 and a first post portion 144 of the clamping member 140, may be configured to be inserted into an end portion of a first tubular member 12, and the second end portion of the in-line joint 120, including a second post 126 of the connector 122 and the post portion 144 of the clamping member 140, may be configured to be inserted into an end portion of the tubular extension 84, or other tubular member. The first end portion of the in-line joint 120 may include a rim 170 against which the end of the first tubular member 12 may abut, and the second end portion of the in-line joint 120 may include a rim 170 against which the end of the tubular extension 84, or other tubular member, may abut.

When inserted into a tubular member, the posts 126 may be coaxial with the central longitudinal axis of the tubular members between which the in-line joint 120 is coupled. The in-line joint 120 may permit a range of adjustment for the mounting fixture 10. For example, the in-line joint 120 may be permit rotation about the longitudinal axis of the in-line joint 120, and thus may permit the first tubular member 12 to be rotated relative to the tubular extension 84 of the base mount 80.

Once the desired orientation of the mounting fixture 10, or components thereof, has been obtained, the in-line joint 120 may be secured to the first tubular member 12 and/or tubular extension 84, or other tubular member. For example, as shown in FIG. 9, the post 126 of the connector 122 and the post portion 144 of the clamping member 140, inserted into the end region of the first tubular member 12, may be configured to cooperatively exert a radially outward force F1 on an interior surface of the first tubular member 12. For example, the threaded stud 60 may be rotated in a first direction (e.g., with a driver inserted into the driver engagement feature 68) to move the post portion 144 of the clamping member 140 relative to the post 126 of the connector 122 in the channel 132 to cooperatively exert a radially outward force F1 on the interior surface of the first tubular member 12. Thus, the peripheral surface 152 of the post 126 and the arcuate surface 154 of the post portion 144 may bear against the interior surface of the first tubular member 12 to lock the in-line joint 120 from rotation relative to the first tubular member 12 about the longitudinal axis of the first tubular member 12. Accordingly, the first end portion of the in-line joint 120 may be clamped to the end of the first tubular member 12 without clamping to an exterior surface of the first tubular member 12. Furthermore, in some instances, the in-line joint 120 may be sized such that no portion of the in-line joint 120 has a diameter greater than the outer diameter of the first tubular member 12. In other words, in some instances, the in-line joint 120 may be sized such that the greatest diameter of the in-line joint 120 is less than or equal to the outer diameter of the first tubular member 12.

Similarly, the post 126 of the connector 122 and the post portion 144 of the clamping member 140, inserted into the end region of the tubular extension 84, or other tubular member, may be configured to cooperatively exert a radially outward force F2 on an interior surface of the tubular extension 84, or other tubular member. For example, the threaded stud 60 may be rotated in a first direction (e.g., with a driver inserted into the driver engagement feature 68) to move the post portion 144 of the clamping member 140 relative to the post 126 of the connector 122 in the channel 132 to cooperatively exert a radially outward force F2 on the interior surface of the tubular extension 84, or other tubular member. Thus, the peripheral surface 152 of the post 126 and the arcuate surface 154 of the post portion 144 may bear against the interior surface of the tubular extension 84, or other tubular member, to lock the in-line joint 120 from rotation relative to the tubular extension 84 of the base mount 80, or other tubular member. Accordingly, the second end portion of the in-line joint 120 may be clamped to the end of the tubular extension 84, or other tubular member, without clamping to an exterior surface of the tubular extension 84, or other tubular member. Furthermore, in some instances, the in-line joint 120 may be sized such that no portion of the in-line joint 120 has a diameter greater than the outer diameter of the tubular extension 84, or other tubular member. In other words, in some instances, the in-line joint 120 may be sized such that the greatest diameter of the in-line joint 120 is less than or equal to the outer diameter of the tubular extension 84, or other tubular member.

As can be evidenced from FIG. 9, due to the opposing threadedness of the threaded bores 136, 150 and the threaded end regions 62, 64 of the threaded stud 60, rotation of the threaded stud 60 in a first direction acts to force the post 126 and the post portion 144 apart, whereas rotation of the threaded stud 60 in a second, opposite direction acts to draw the post portion 144 toward the post 126.

Once the mounting fixture 10, or components thereof, has been locked into a desired configuration, in some instances the in-line joint 120 may be welded to prevent unintentional loosening of the in-line joint 120. In other words, in some instances, the threaded stud 60 may be used to provisionally or temporarily clamp the in-line joint to the first tubular member 12 and the tubular extension 84, or other tubular member, until the in-line joint 120 is permanently secured to the first tubular member 12 and the tubular extension 84, or other tubular member.

For example, as shown in FIG. 7, the first tubular member 12 may be welded to the first end portion of the in-line joint 120 around the interface 172 between the first tubular member 12 and the in-line joint 120 proximate the rim 170 while the first end portion of the in-line joint 120 is clamped to the first tubular member 12 with the threaded stud 60, thus forming a metallurgical bond between the first tubular member 12 and the connector 122 and the clamping member 140 at the interface 172. Likewise, the tubular extension 84, or other tubular member, may be welded to the second end portion of the in-line joint 120 around the interface 172 between the tubular extension 84, or other tubular member, and the connector 122 and the clamping member 140 proximate the rim 170 while the second end portion of the in-line joint 120 is clamped to the tubular extension 84, or other tubular member, with the threaded stud 60, thus forming a metallurgical bond between the tubular extension 84, or other tubular member, and the connector 122 and the clamping member 140 at the interface 172.

As discussed above, any desired welding technique may be used, and the tubular members, as well as the components of the in-line joint 120 may be formed of any desired metal material permitting welding, such as stainless steel, steel, aluminum, tungsten, titanium, or other metal materials. For example, in some instances, a tungsten inert gas (TIG) welding process may be used to weld the tubular members to the in-line joint 120. Other welding techniques for creating a metallurgical bond between the various components may be used, such as metal inert gas (MIG) welding or manual metal arc (MMA) welding, if desired.

It is understood by this disclosure, that a mounting fixture 10 including any quantity and/or arrangement of tubular members, articulation joints 20, in-line joints, base mounts 80 and/or workpiece mounts 90, as well as other components, may be utilized to obtain a desired configuration of the mounting fixture 10 to position the workpiece 4 in a desired position relative to the apparatus 6.

Referring again to FIG. 2, it can be seen that the mounting fixture 10 may permit a workpiece 4 mounted to the second end 18 of the mounting fixture 10, such as with the workpiece mount 90, to be adjusted to any desired orientation. For example, the workpiece 4 may be rotated about the longitudinal axis A, may be rotated about the longitudinal axis B, may be rotated about the longitudinal axis C, and/or pivoted about the pivot axis Z of either articulation joint 20 to move the workpiece 4 into a desired position relative to the apparatus 6. Additional joints may be provided to provide further adjustment for the mounting fixture 10, as desired. Furthermore, the tubular members used in constructing the mounting fixture 10 may be cut to any desired length to position the articulation joints 20 and/or in-line joints 120 at any desired location. Thus, the workpiece 4 may be customized for any application in which it is desirable to position a workpiece 4 in a fixed position relative to an apparatus, and thus may be configured with any combination of articulation joints 20, in-line joints 120, base mounts 80, workpiece mounts 90, and/or tubular members of desired lengths to achieve the positioning desired.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A mounting fixture comprising:
 a first tubular member having a first end, a second end and a central longitudinal axis extending therethrough;
 a second tubular member having a first end, a second end and a central longitudinal axis extending therethrough; and
 an articulation joint coupled between the first tubular member and the second tubular member to position the longitudinal axis of the first tubular member at a desired angle relative to the longitudinal axis of the second tubular member;
 the articulation joint including:
 a first monolithic articulation member including a first head and a first post, the first post configured to extend into the first tubular member;
 a second monolithic articulation member including a second head and a second post, the second post configured to extend into the second tubular member;
 a first monolithic clamping member including a first head portion and a first post portion, the first post portion configured to extend into the first tubular member;
 a second monolithic clamping member including a second head portion and a second post portion, the second post portion configured to extend into the second tubular member;
 a first threaded stud extending through the first and second heads of the first and second articulation members, and including a first threaded end portion having right-handed threads and a second threaded end portion having left-handed threads, the first threaded end portion threadably engaging a threaded bore extending into one of the first head portion of the first clamping member and the second head portion of the second clamping member, and the second threaded end portion threadably engaging a threaded bore extending into the other of the first head portion of the first clamping member and the second head portion of the second clamping member;

a second threaded stud including a first threaded end portion having right-handed threads and a second threaded end portion having left-handed threads, the first threaded end portion threadably engaging a threaded bore extending into one of the first post portion of the first clamping member and the first post of the first articulation member, and the second threaded end portion threadably engaging a threaded bore extending into the other of the first post portion of the first clamping member and the first post of the first articulation member; and a third threaded stud including a first threaded end portion having right-handed threads and a second threaded end portion having left-handed threads, the first threaded end portion threadably engaging a threaded bore extending into one of the second post portion of the second clamping member and the second post of the second articulation member, and the second threaded end portion threadably engaging a threaded bore extending into the other of the second post portion of the second clamping member and the second post of the second articulation member;

wherein the first post of the first articulation member and the first post portion of the first clamping member are configured to cooperatively exert a radially outward force on an interior surface of the first tubular member;

wherein the second post of the second articulation member and the second post portion of the second clamping member are configured to cooperatively exert a radially outward force on an interior surface of the second tubular member; and wherein the first head portion of the first clamping member and the second head portion of the second clamping member are configured to cooperatively exert a compressive force against the first head of the first articulation member and the second head of the second articulation member to clamp the first articulation member from pivotable movement relative to the second articulation member with a clamping surface of the first head portion of the first clamping member engaging a clamping surface of the second head of the second articulation member and a clamping surface of the second head portion of the second clamping member engaging a clamping surface of the first head of the first articulation member.

2. The mounting fixture of claim 1, wherein the first head of the first articulation member includes a conical recess for receiving a conical extension of the second head portion of the second clamping member therein.

3. The mounting fixture of claim 2, wherein the second head of the second articulation member includes a conical recess for receiving a conical extension of the first head portion of the first clamping member therein.

4. The mounting fixture of claim 3, wherein rotation of the first threaded stud in a first direction moves the first head portion toward the second head portion to clamp the first and second heads therebetween.

5. The mounting fixture of claim 4, wherein rotation of the first threaded stud in a second direction moves the first head portion away from the second head portion to unclamp the first and second heads.

6. The mounting fixture of claim 5, wherein the first head of the first articulation member includes a bore extending therethrough and the second head of the second articulation member includes a bore extending therethrough axially aligned with the bore of the first head of the first articulation member, the first threaded stud extending through the bores of the first and second heads.

7. The mounting fixture of claim 1, wherein rotation of the second threaded stud in a first direction moves the first post portion of the first clamping member relative to the first post of the first articulation member to cooperatively exert a radially outward force on the interior surface of the first tubular member.

8. The mounting fixture of claim 1, wherein rotation of the third threaded stud in a first direction moves the second post portion of the second clamping member relative to the second post of the second articulation member to cooperatively exert a radially outward force on the interior surface of the second tubular member.

* * * * *